United States Patent
Syed et al.

(10) Patent No.: US 12,422,882 B2
(45) Date of Patent: Sep. 23, 2025

(54) SOLVING OPTIMIZATION PROBLEMS WITH PHOTONIC CROSSBARS

(71) Applicant: INTERNATIONAL BUSINESS MACHINES CORPORATION, Armonk, NY (US)

(72) Inventors: Ghazi Sarwat Syed, Zurich (CH); Abu Sebastian, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 775 days.

(21) Appl. No.: 17/643,256

(22) Filed: Dec. 8, 2021

(65) Prior Publication Data
US 2023/0176606 A1    Jun. 8, 2023

(51) Int. Cl.
| | |
|---|---|
| G06E 1/04 | (2006.01) |
| G06F 7/544 | (2006.01) |
| G06F 17/11 | (2006.01) |
| G06F 17/16 | (2006.01) |
| G06G 7/16 | (2006.01) |

(52) U.S. Cl.
CPC ........... *G06E 1/045* (2013.01); *G06F 7/5443* (2013.01); *G06F 17/11* (2013.01); *G06F 17/16* (2013.01); *G06G 7/16* (2013.01)

(58) Field of Classification Search
CPC ... G06E 1/00; G06E 1/045; G06E 3/003–005; G06E 3/008; G06F 17/11; G06F 17/16; G06F 7/5443; G06G 7/16; G06G 7/19
See application file for complete search history.

(56) References Cited

U.S. PATENT DOCUMENTS

| | | |
|---|---|---|
| 2018/0046598 A1 | 2/2018 | Le Gallo |
| 2021/0065087 A1 | 3/2021 | Oshima |
| 2022/0012013 A1* | 1/2022 | Sebastian ................ G06E 3/003 |
| 2022/0044092 A1* | 2/2022 | Pleros .................... G06N 3/063 |

(Continued)

OTHER PUBLICATIONS

Aramon et al., "Physics-Inspired Optimization for Quadratic Unconstrained Problems Using a Digital Annealer," Frontiers in Physics, vol. 7, Article 48, Apr. 5, 2019, doi: 10.3389/fphy.2019.00048, 14 pages.

(Continued)

*Primary Examiner* — Matthew D Sandifer
(74) *Attorney, Agent, or Firm* — Samuel A. Waldbaum

(57) ABSTRACT

The invention is directed to solving an optimization problem. The method operates a photonic crossbar array structure including N input lines and M output lines, which are interconnected at junctions via N×M photonic memory devices, where N≥2 and M≥2. The photonic memory devices are programmed to store respective weights in accordance with the optimization problem. The photonic crossbar array structure is operated as follows. First, the method determines values of L input vectors of N components each, where L≥2. Second, based on the determined values, N electromagnetic signals are generated, where each of the generated signals multiplexes L input signals encoded at respective wavelengths, so as for the N electromagnetic signals to map the L input vectors of N components each. Third, the N electromagnetic signals generated are applied to the N input lines of the photonic crossbar array structure.

20 Claims, 5 Drawing Sheets

(56) References Cited

U.S. PATENT DOCUMENTS

2022/0263582 A1* 8/2022 Ma .................. H04B 10/614
2023/0152667 A1* 5/2023 Miscuglio ............... G06E 3/003
359/107

OTHER PUBLICATIONS

Bruckerhoff-Pluckelmann et al., Chalcogenide phase-change devices for neuromorphic photonic computing, J. Appl. Phys. 129, 151103 (2021); Published Online: Apr. 21, 2021, https://doi.org/10.1063/5.0042549, 9 pages.

Cai et al., "Power-efficient combinatorial optimization using intrinsic noise in memristor Hopfield neural networks," Nature Electronics, vol. 3, Jul. 2020, https://doi.org/10.1038/s41928-020-0436-6, pp. 409-418.

Cheng et al., "Photonic Matrix Computing: From Fundamentals to Applications," Nanomaterials 2021, 11, 1683, Published Jun. 26, 2021, https://doi.org/10.3390/nano11071683, 15 pages.

Feldmann et al., :"Parallel convolutional processing using an integrated photonic tensor core," Nature, vol. 589, Jan. 7, 2021, https://doi.org/10.1038/s41586-020-03070-1, 10 pages.

Grace Period Disclosure, "Parallel convolutional processing using an integrated photonic tensor core," Feldmann et al., Nature, vol. 589, 2021, https://doi.org/10.1038/s41586-020-03070-1, Published Jan. 6, 2021, Accessed: Dec. 6, 2021, 32 pages.

Hu et al, "Associative memory realized by a reconfigurable memristive Hopfield neural network," Nature Communications, 6:7522, Published Jun. 25, 2015, DOI: 10.1038/ncomms8522 | www.nature.com/naturecommunications, 8 pages.

Inagaki et al., "A coherent Ising maching for 2000-node optimization problems," Science, vol. 354, Issue 6312, Nov. 4, 2016, pp. 603-606.

Johnson et al., "Quantum annealing with manufactured spins," Nature, vol. 473, May 12, 2011, doi:10.1038/nature10012, pp. 194-198.

King et al., "Emulating the coherent Ising machine with a mean-field algorithm," arXiv:1806.08422v1 [quant-ph] Jun. 21, 2018, https://arxiv.org/pdf/1806.08422.pdf, 5 pages.

Leleu et al., "Combinatorial optimization using dynamical phase transitions in driven-dissipative systems," Physical Review E 95, 022118 (2017), Published: Feb. 14, 2017, https://journals.aps.org/pre/abstract/10.1103/PhysRevE.95.022118, 18 pages.

Prabhu et al., "Accelerating recurrent Ising machines in photonic integrated circuits," Optica, vol. 7, No. 5, May 2020, pp. 551-558.

Rios et al., "In-memory computing on a photonic platform," Science Advances, vol. 5, No. 2, eaau5759, Feb. 15, 2019, DOI: 10.1126/sciadv.aau5759, 10 pages.

Rios et al., "Integrated all-photonic non-volatile multi-level memory," Nature Photonics, vol. 9, Sep. 21, 2015, pp. 725-732.

Sebastian et al., "In-Memory Computing Using Photonic Memory Devices," IBM Research (Blog), Feb. 15, 2019, https://www.ibm.com/blogs/research/2019/02/photonic-memory-devices/, 7 pages.

Wu et al., "Programmable phase-change metasurfaces on waveguides for multimode photonic convolutional neural hetwork," Nature Communications, (2021), 12:96 https://doi.org/10.1038/s41467-020-20365-z, 8 pages.

* cited by examiner

SOLVING OPTIMIZATION PROBLEMS WITH PHOTONIC CROSSBARS

STATEMENT REGARDING PRIOR DISCLOSURES BY THE INVENTOR OR A JOINT INVENTOR

The publication "Parallel convolutional processing using an integrated photonic tensor core", by J. Feldmann, N. Youngblood, M. Karpov, H. Gehring, X. Li, M. Stappers, M. Le Gallo, X. Fu, A. Lukashchuk, A. S. Raja, J. Liu, C. D. Wright, A. Sebastian, T. J. Kippenberg, W. H. P. Pernice, and H. Bhaskaran (Nature 589, 52-58, 2021, https://doi.org/10.1038/s41586-020-03070-1, was co-authored by Abu Sebastian and published on Jan. 6, 2021. Abu Sebastian and Syed Ghazi Sarwat have invented the subject matter of the present document.

BACKGROUND

The present invention relates, generally, to the field of computing, and more particularly to methods and processing systems for solving optimization problems such as combinatorial problems. In particular, it concerns methods which apply electromagnetic signals to input lines of a photonic crossbar array to perform matrix-vector operations involved in an optimization problem, where the electromagnetic signals multiplex input signals encoded at different wavelengths to parallelize the matrix-vector operations.

The aim of an optimization problem is to find an optimal solution from a set of feasible solutions. Optimization problems are ubiquitous in research and development, engineering, mathematics, computer science, and economics. A particularly important class of optimization problems are the combinatorial optimization problems. Examples of such problems include the travelling salesperson problem, Internet routing problems, and graph problems such as the Max-Cut problem.

Solving such problems usually requires finding a global optimum in the presence of a number of local (spurious) optima, which may become extremely challenging, computationally speaking. In many cases, particularly for NP-complete optimization problems, the solution found happens to be sub-optimal.

Such problems are typically (attempted to be) solved using digital computers. Quantum computing is often thought to have potential to efficiently solve combinatorial optimization problems. However, quantum information processing technologies may not be able to deliver their full potential in a nearest future.

Aside from digital and quantum computers, a variety of analog devices have been proposed to accelerate computations. For instance, neuromorphic devices have been proposed, which are based on crossbar array structures that are used to perform operations involved in the execution (training or inferencing) of artificial neural networks (ANNs). Of particular interest for ANNs are memristive crossbar arrays, where memristors are assembled in crossbar arrays with data bits encoded by the resistance of the individual cells.

SUMMARY

According to a first aspect, the present invention is embodied as a method of solving an optimization problem. The method operates a photonic crossbar array structure including N input lines and M output lines, which are interconnected at junctions via N×M photonic memory devices, where $N \geq 2$ and $M \geq 2$. The photonic memory devices are programmed to store respective weights in accordance with the optimization problem. The photonic crossbar array structure is operated as follows. First, the method determines values of L input vectors of N components each, where $L \geq 2$. Second, based on the determined values, N electromagnetic signals are generated, where each of the generated signals multiplexes L input signals encoded at respective wavelengths, so as for the N electromagnetic signals to map the L input vectors of N components each. Third, the N electromagnetic signals generated are applied to the N input lines of the photonic crossbar array structure. This causes the photonic crossbar array structure to simultaneously perform L×M matrix-vector operations as multiply-accumulate operations on the L input vectors. I.e., the L vectors are simultaneously processed, something that cannot be achieved with digital and analog single core processing units. The method further comprises reading out output signals obtained in output of the M output lines and demultiplexing the output signals read out to obtain L×M output values, so as to eventually determine a solution of the optimization problem based on the L×M output values obtained. Several iterations may be needed.

According to another aspect, the invention is embodied as a processing system for solving an optimization problem. Consistently with the above method, the system comprises a photonic crossbar array structure including N input lines and M output lines interconnected at junctions via N×M photonic memory devices, where $N \geq 2$ and $M \geq 2$. Again, the photonic memory devices are programmable, so as to store respective weights in accordance with the optimization problem. The system further includes a processing unit, a signal generator, a signal coupling unit, a readout unit, and a demultiplexing unit. The processing unit is configured to determine values of L input vectors of N components each, where $L \geq 2$. The signal generator is interfaced with the processing unit to generate N electromagnetic signals based on values determined by the processing unit. In operation, each of the N electromagnetic signals multiplexes L input signals encoded at respective wavelengths, so as for the N electromagnetic signals to map the L input vectors of N components each. The signal coupling unit is connected to each of the signal generator and the photonic crossbar array structure to apply the N electromagnetic signals generated by the signal generator to the N input lines of the photonic crossbar array structure and cause the latter to simultaneously perform L×M matrix-vector operations as multiply-accumulate operations on the L input vectors. The readout unit is configured to read out output signals obtained in output of the M output lines. The demultiplexing unit is configured to demultiplex output signals read out by the readout unit and obtain L×M output values. The processing unit is interfaced with the readout unit and is further configured to determine a solution of the optimization problem based on the L×M output values obtained.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

The accompanying drawings show simplified representations of devices or parts thereof, as involved in embodiments. Similar or functionally similar elements in the figures have been allocated the same numeral references, unless otherwise indicated.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The following description is structured as follows. General embodiments and high-level variants are described in section 1. Section 2 addresses particularly preferred embodiments. Note, the present method and its variants are collectively referred to as the "present methods". All references Sn refer to methods steps of the flowcharts of FIG. 7, while numeral references pertain to devices, components, and concepts involved in the present invention.

General Embodiments and High-Level Variants

A first aspect of the invention is now described in detail with references to FIGS. 1-4, and 7. This aspect concerns a method of solving an optimization problem.

Figure 2:
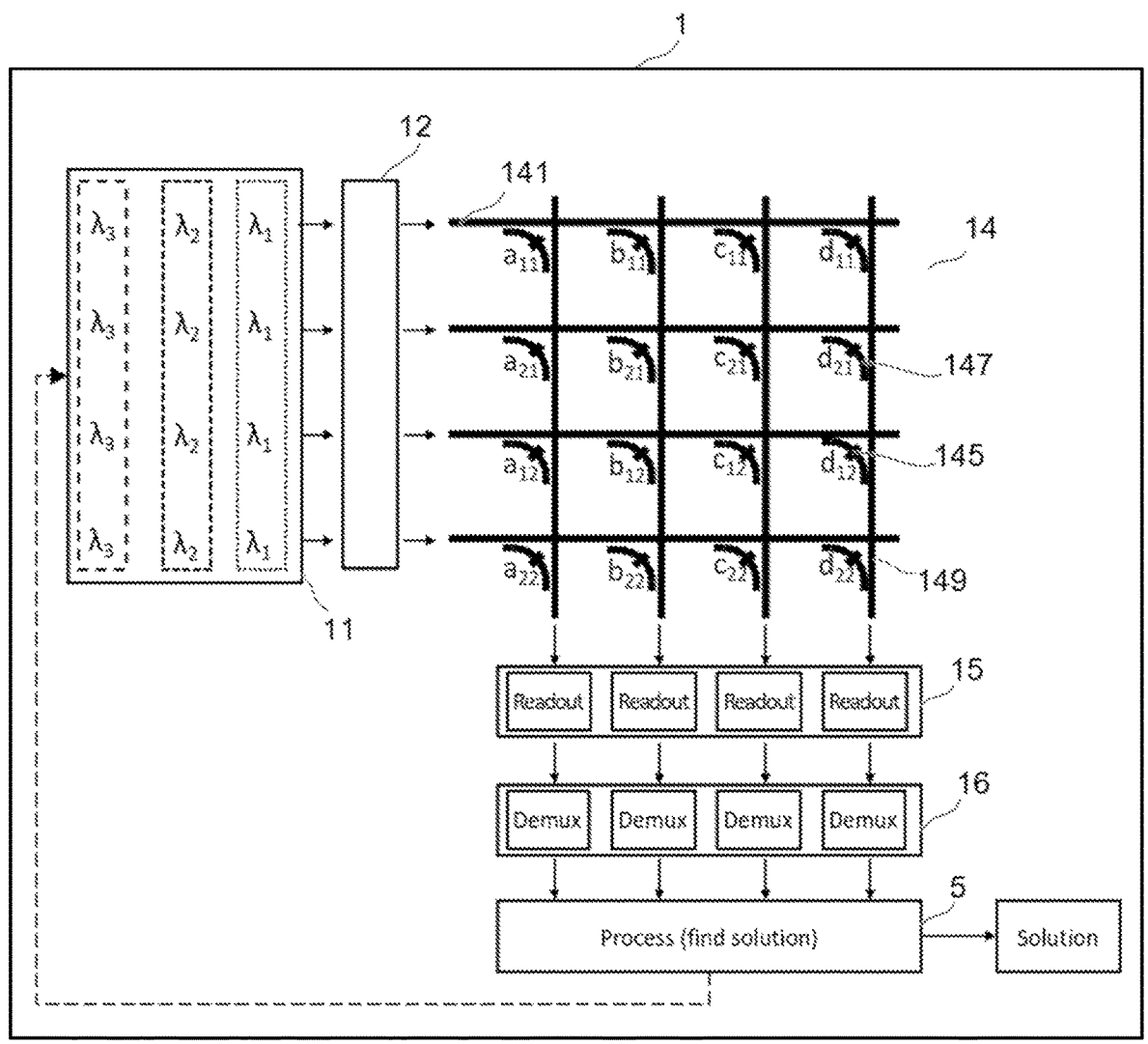
FIG. 2 is a more detailed version of the diagram of FIG. 1B.
Figure 3:
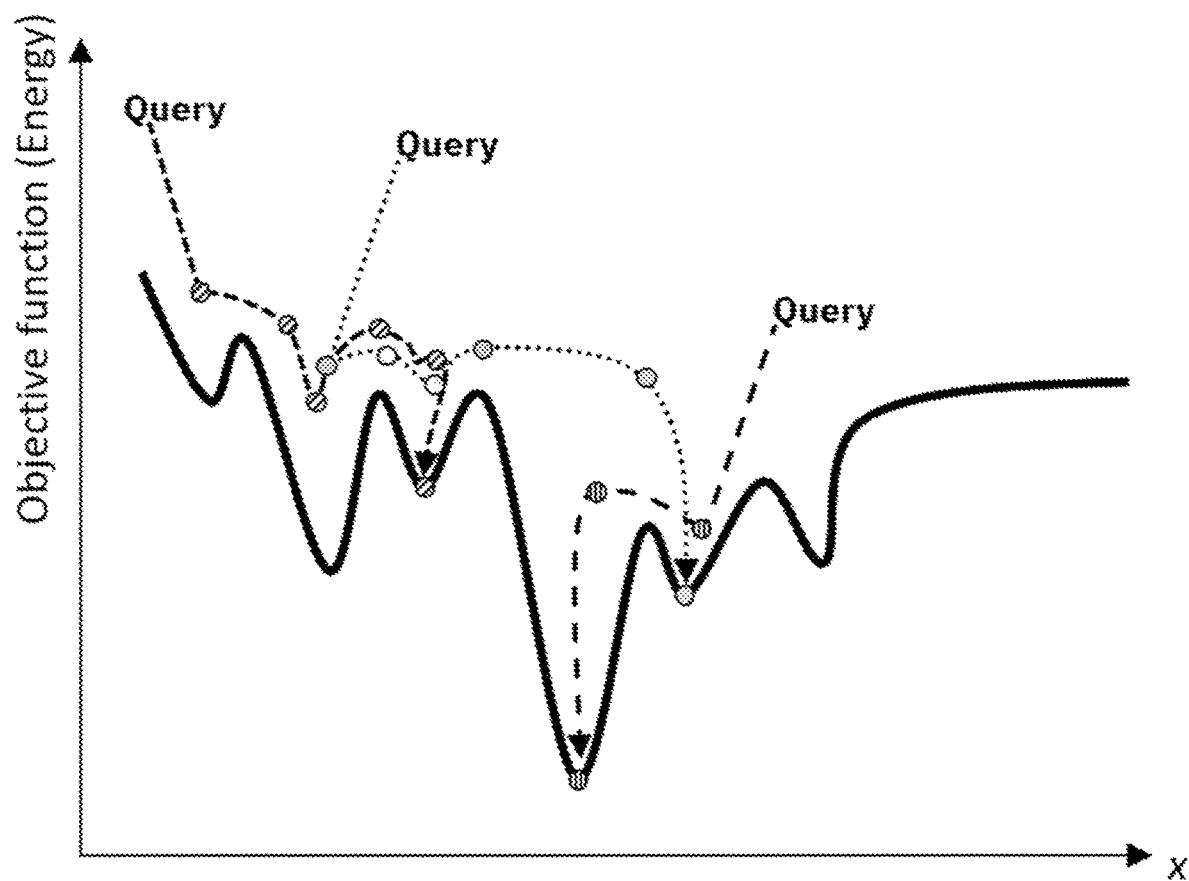
FIG. 3 is a plot that schematically represents possible trajectories of solutions output by a method according to embodiments, where the output space is projected to a 2D space, for the sake of depiction. The output trajectories explore the output solution space with a view to identifying an optimal solution to a problem, which aims at minimizing an energy.

The proposed method relies on a photonic crossbar array structure 14, such as depicted in FIG. 2. This photonic crossbar array structure is hereafter referred to as a "crossbar", for simplicity. The crossbar includes N input lines 141 and M output lines 149, where $N \geq 2$ and $M \geq 2$. Note, N=4 and M=4 in the simple example shown in FIG. 2. In practice, however, the crossbar may include hundreds to thousands of input and output lines. The input lines 141 and output lines 149 are interconnected at junctions via N×M photonic memory devices 145.

The crossbar 14 can be regarded as including N×M cells in a crossbar configuration. Each cross-point of the crossbar configuration corresponds to a cell and each cell involves a photonic memory device. Such devices 145 must be programmed to store respective weights, i.e., values that multiply a signal they are subjected to. That is, signals coupled into the input lines 141 will respectively be multiplied by values stored by the memory devices 145. The weights are determined in accordance with the optimization problem to be solved. I.e., the weights capture the problem to be solved and need to be programmed accordingly where changing the problem requires reprogramming the weights.

Note, the devices 145 may advantageously include non-volatile, phase-change photonic memory devices. Such devices are known per se, they can be modulated either optically or electrically to store binary or multi-bit data, similar to synaptic weights of synaptic crossbar array crossbars used in neuromorphic devices, albeit for a different purpose. In variants, one may also use optical modulators, such as electro-optic, thermo-optic or mechanical (NEMS) modulators, also known per se. Unlike the phase-change devices evoked above, however, such modulators are volatile. I.e., power need be constantly applied to maintain the value stored in the devices. Still, they can be reconfigured based on the problem at hand, just like the phase change memory cells.

Figure 7:
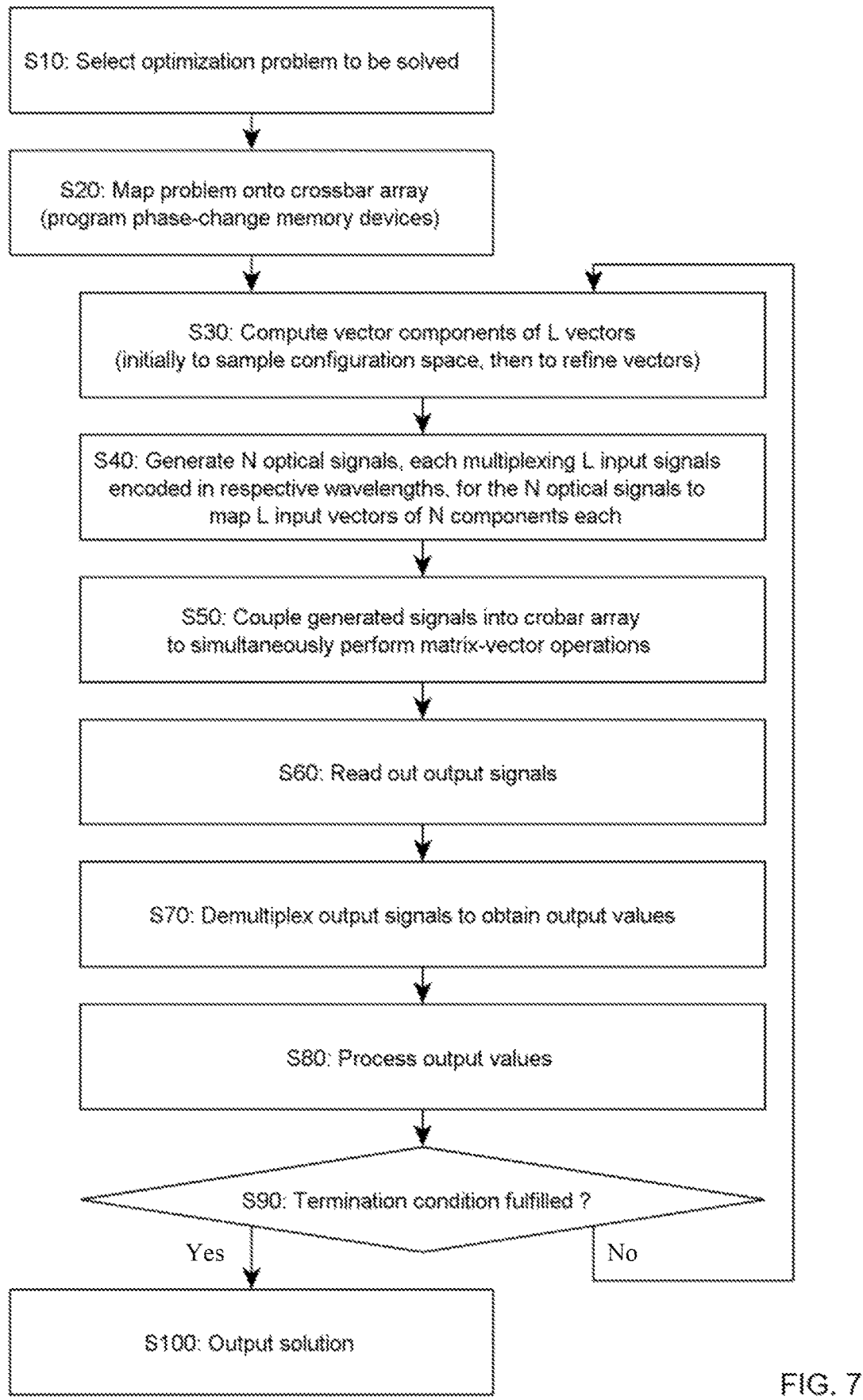
FIG. 7 is a flowchart illustrating high-level steps of a method of solving an optimization problem, according to embodiments.

The crossbar is operated as follows:

First, some vector components are determined at step S30, see the flowchart in FIG. 7. More precisely, the values of L input vectors are determined ($L \geq 2$), where each of the vectors include N components;

Next, N electromagnetic signals are generated S40 based on the determined values. Each of the N electromagnetic signals multiplexes L input signals, where such input signals are encoded at respective wavelengths. This is done in such a manner that the N electromagnetic signals map the L input vectors (of N components each), consistently with the values determined at step S30; and The N electromagnetic signals are applied (step S50) to the N input lines 141 of the crossbar 14. Step S50 is concomitant with step S40, inasmuch as the generated electromagnetic signals are immediately guided and coupled into the crossbar 14.

Coupling the N electromagnetic signals into the crossbar 14 causes the latter to simultaneously perform L×M matrix-vector operations. By construction of the crossbar, such matrix-vector operations are performed as multiply-accumulate operations on the L input vectors. Moreover, they can be regarded as in-coherent optics operations, owing to the multiplexing of the L input signals in each of the N electromagnetic signals.

Of particular importance is that the L×M multiply and accumulate operations are being performed in parallel for each of the N components of the L vectors and for each of the L vectors. I.e., not only a set of matrix-operations are simultaneously performed (as in analog electronic crossbar circuitry) but, in addition, the matrix-vector operations are simultaneously performed for the L vector, something that is not possible with analog electronics. Note, no parallelism at all is possible with single processing cores based on digital electronics. The optical interaction occurring at every cell results in a scalar multiplication operation and the output at each column are accumulated computations. The L×M multiply and accumulate operations imply L×N×M scalar operations. I.e., each cell is performing L operations in parallel at the same time, whereas an analog cell performs only one operation. Thanks to the multiplexed signals, the photonic approach adopted here results in that a single computation step amounts to performing L times more operations in parallel, compared with an analog crossbar processing electrical signals. The extent of the parallelism enabled by the present approach is even more remarkable when compared to computation steps in the electronic domain, since a single processing core requires the L×N×M scalar operations to be performed independently at different time instances.

As a result of the operation of the crossbar 14, output signals are obtained in output of the M output lines 149. The output signals are read out at step S60. Such signals need be demultiplexed (step S70), which makes it possible to obtain L×M output values. Eventually, a solution of the optimization problem is determined S80-S100 based on the L×M output values obtained.

The N electromagnetic signals generated at step S40 are optical signals, which are not necessarily limited to the visible spectrum. In particular, near ultraviolet or infrared signals may be used. Typical applications may for instance make use of signals at telecom wavelengths. The N electromagnetic signals embody the data channels. Each electromagnetic signal encodes distinct messages, i.e., potential solutions (also called queries in this document), in the form of vectors. That is, the N input signals form L vectors, where each vector component is encoded at a respective, distinct wavelength. In other words, each vector corresponds to a query, i.e., a query performed with a view to solving the optimization problem.

The vector components can for instance be encoded using wavelength-division multiplexing (WDM). That is, each of the N electromagnetic signals multiplexes L input signals, where the input signals may be encoded using WDM. In variants to WDM, the multiple input signals can be encoded using, e.g., polarization or multimodal excitation. However, WDM is preferred as it is typically easier to implement in practice.

In all cases, the distinct wavelengths make it possible to parallelize operations that would require distinct time step computations with digital electronic and analog circuitry solutions. Indeed, a tremendous advantage of the multiplexing scheme adopted is that the signals encoded at the various frequencies do not interact, which enables further parallelism and thus much faster computations. The only downside is that the output signals must be demultiplexed. To that aim, the output signals can be coupled to a circuit 16 (electronic digital or analog circuit). To that aim, one may for instance use micro-ring resonators, multimode interference wavelength demultiplexers, or other demultiplexers, which result in a quasi-instantaneous demultiplexing.

The demultiplexed values may then have to be further processed, to obtain the desired solution. Several iterations (or cycles) may possibly be performed, whereby the next input vectors computed at step S30 may depend on values obtained during a previous iteration, thanks to a feedback mechanism. The next cycle can thus be impacted by previous output values. One or more processing cores may be used to perform such cycles, e.g., iteratively with a same core or thanks to parallel or cascaded crossbars.

To summarize, the proposed scheme enables an unprecedented level of parallelism, something that cannot be achieved with digital electronic or, even, electric-based analog circuitry. Thus, the proposed approach speeds up the core computations (i.e., the matrix-vector operations) required to solve the problem, which operations are usually the bottleneck in optimization problems.

Note, the present methods may be applied to a variety of optimization problems that involve linear operations or operations that can somehow be linearized. I.e., beyond combinatorial, linear, and integer-linear optimization problems, other mathematical problems may involve linear operations and thus benefit from matrix-vector operations as recited above. In particular, the present approach may be applied to certain nonlinear optimization problems using special formulations of linear programming problems. In addition, it can be used in other class of problems known from convex optimization theory/operations research, as long as such problems involve linear computation steps.

All this is now described in detail, in reference to particular embodiments of the invention. To start with, the proposed approach makes it possible to quickly scan an energy landscape, as typically involved in optimization and regression-type problems. That is, the values of the L input vectors can initially be determined S30 so as to sample a configuration space of the optimization problem, e.g., an energy landscape in the example of FIG. 3. Each value on the axis x can be regarded as a 1D representation of an input vector in the example of FIG. 3. I.e., the output solution space is projected in a 2D space. Each corresponding value on the axis y corresponds to a value obtained in response to a query. Multiple vectors (each corresponding to a respective query) are simultaneously applied and computed, which results in a set of output trajectories. I.e., the approach proposed makes it possible to simultaneously obtain a set of solutions in the output solution space, in the form of multiwavelength output trajectories. In other words, multiple input queries are performed, which are embodied as multiplexed wavelengths, such that multiple searches can be performed simultaneously with a view to identifying queries tending to the optimal solution, e.g., a global minimum in the example of FIG. 3.

Various algorithms can be contemplated to devise the queries and search through the solutions obtained in the output solution space, and then to devise new vectors (new queries) for a next cycle, if necessary, to eventually identify a solution of the optimization problem. The solution is determined S80-S100 in accordance with an optimization algorithm, which can be chosen in accordance with the optimization problem at hand.

As noted earlier, the weights capture the problem to be solved and thus need to be determined in accordance with the problem at hand. This operation amounts to mapping the problem at hand onto the memory devices 145. As seen in FIG. 7, once an optimization problem has been identified S10, corresponding weights are determined and the devices 145 are programmed S20, in accordance with the optimization problem selected, prior to applying the N electromagnetic signals. Programming the devices 145 results in changing their states. Each device 145 may potentially store binary or multi-bit data. As seen in FIG. 1B, a programming unit 20 is used to modulate the states of the devices 145. The latter can be non-volatile, phase-change memory devices, which can be modulated optically or electrically. In variants where volatile optical modulators are used, the unit 20 continuously applies power to the devices 145 to maintain values stored therein.

As noted earlier, the optimization problem can notably be a linear optimization problem such as a combinatorial optimization problem, or a problem which can be reduced to or expressed as a linear problem or a combination of linear problems. More generally, this problem must involve linear operations as described above (i.e., matrix-vector operations) to benefit from the present approach. In the following, the optimization problem at hand is assumed to be a combinatorial problem. It may notably be a travelling salesperson problem, an Internet routing problem, or a Max-Cut problem. It may also be a graph-based optimization problem, such as a logistic problem, e.g., relating to flight scheduling or assembly lines.

This problem can typically be formulated as finding a particular vector x that minimizes the quantity c·x subject to the constraints m·x≥b and x≥0. I.e., linear constraints are specified by the matrix m and pairs of values $\{b_i, s_i\}$, where $b_i$ determines the constraint and $s_i$ determines the type of (in)equality involved in the corresponding constraint i. I.e., for each row $m_i$ of m, the corresponding constraint is $m_i \cdot x \geq b_i$, $m_i \cdot x \leq b_i$, or $m_i \cdot x = b_i$, depending on $s_i$. In this example, the goal function is the minimum function, i.e., the goal is to find min(c·x) under certain constraints. More generally, the problem may be formulated by defining an objective function c(x) together with a goal function, e.g., to minimize or maximize c(x). I.e., the goal function is then to extremize c(x), i.e., find min(c(x)) or max(c(x)), subject to one or more constraints expressed as respective functions $f_i(c(x))$, e.g., $f_i(c(x)) \leq b_i$.

Thanks to the proposed approach, the solution can be determined S80-S100 by identifying a global optimum based on one or more of the L×M output values obtained, after one or more iterations (or cycles), in accordance with the optimization algorithm chosen.

Figure 4:
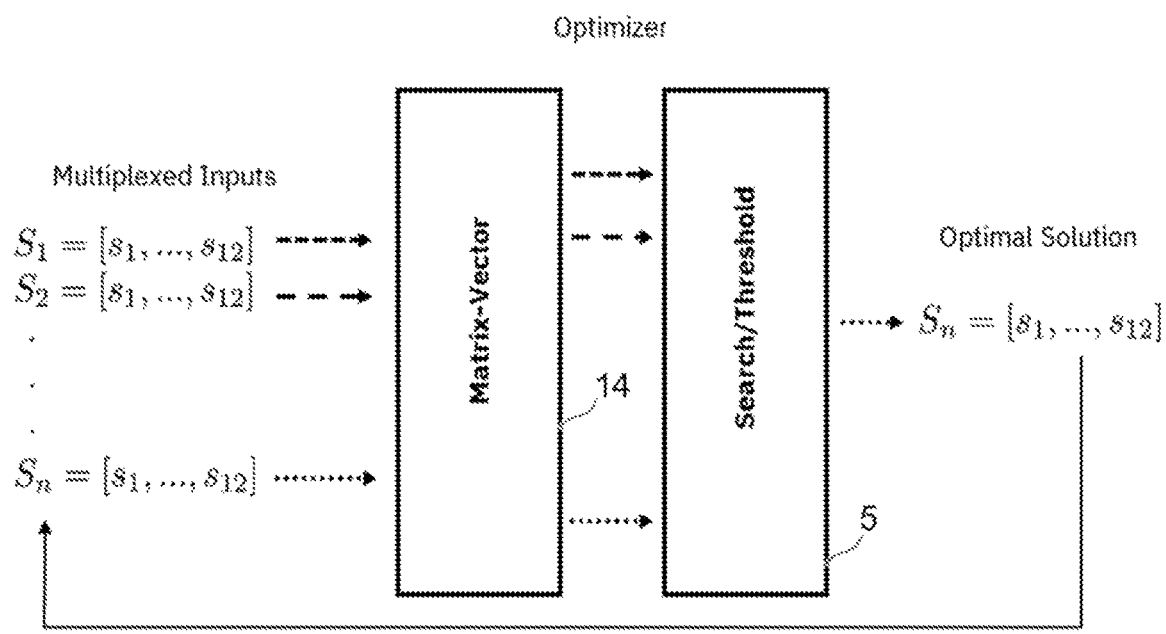
FIG. 4 is a diagram schematically illustrating the resolution of a given optimization problem (here a Max-Cut problem), according to embodiments.

The values of the L input vectors determined at step S30 give rise to L×M output values in the output solution space. Such vectors can be refined during subsequent iterations, which draw trajectories in the output solution space. The solution is determined S80 by searching through said trajectories, with a view to eventually identifying a global optimum. In particular, a local search function can be performed on the output trajectories to uncover an optimal solution, as illustrated in FIG. 4. The local search can be performed using different methods, e.g., based on the so-called thresholding approach, the Hamming distance, etc. The termination condition used typically depends on the problem chosen. Various possible convergence criteria can be used in the optimizer.

Figure 1A:
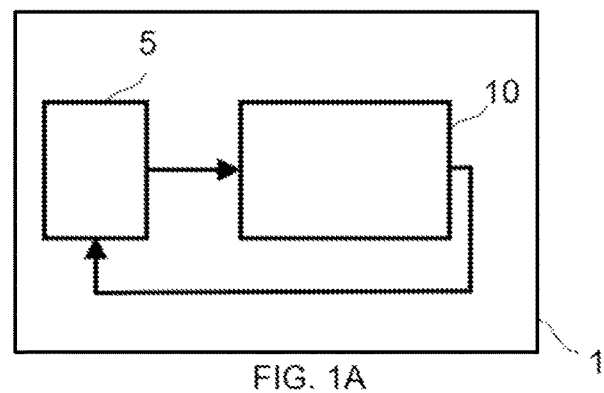
FIGS. 1A and 1B are diagrams showing the main components of a system for solving an optimization problem, according to embodiments. Such components include a processing unit and a photonic crossbar array structure.
Figure 1B:
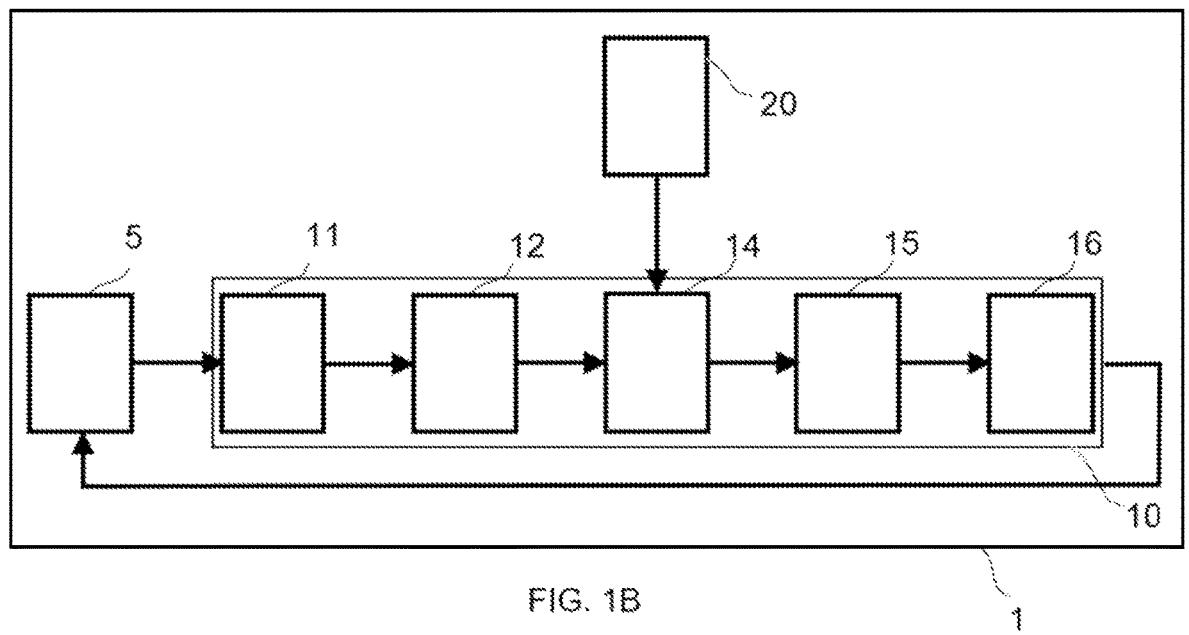

In terms of hardware, and as seen in FIG. 1A, the values of the L input vectors are preferably determined S30 by an external processing unit 5, which is connected to a core processing 10 that includes the crossbar 14. The solution is eventually determined S80-S100 by the processing unit 5. The processing unit 5 is typically an electronic circuit (e.g., a digital processor or an analog circuit). It may also include a computational memory unit, equipped with memristive devices. Any type of memristive device may be contemplated here, such as phase-change memory cells, resistive random-access memory (RRAM), static random-access memory (SRAM), or electro-chemical random-access memory (ECRAM). Interestingly, the present approach is further compatible with quasi-passive photonic processing units. In that case, the external processing unit is a photonic unit too.

As evoked above, the proposed approach may typically involve several iterations. Such iterations may possibly involve one or more crossbars 14. Where a single core processing device 10 is used (i.e., including a single crossbar 14), several iterations of computations can be performed with the same core processing device 10. Where several core processing devices 10 are relied on (thus involving several crossbars 14), several sets of matrix-vector operations can be performed concomitantly across the various core processing devices 10, and several iterations may further be performed, based on results of the several sets of matrix-vector operations. Note, each of the above sets of matrix-vector operations refers to one simultaneous set of L×M matrix-vector operations, i.e., corresponding to one basic compute step with one crossbar 14 to which multiplexed optical signals are applied. One iteration involves a single set of L×M matrix-vector operations where a single core 10 is involved. However, each iteration may also involve several concomitant sets of matrix-vector operations where multiple cores 10 are used to perform parallel computations, as assumed in FIG. 6. To summarize, several cycles of operations can potentially be performed thanks to the one or more core processing devices 10. Plus, the present methods may repeatedly operate S30-S90 the one or more core processing devices 10, resulting in several iterations.

Each iteration may exploit independent queries, whereby input vectors are tried at random. Preferably though, a feedback mechanism is used to compute the next vectors and thus optimize the search through the solution space. I.e., at each iteration but the first one, the values of the new L input vectors can be determined S30 based on the L×M output values obtained at the end of the previous iteration. That is, the vector components can be refined from one iteration to the other; the idea is to iteratively couple new input signals in the crossbar(s), each time with input values that are ingeniously changed in view of the previous results, with the goal to most rapidly converge toward an optimal solution of the problem.

Figure 5:
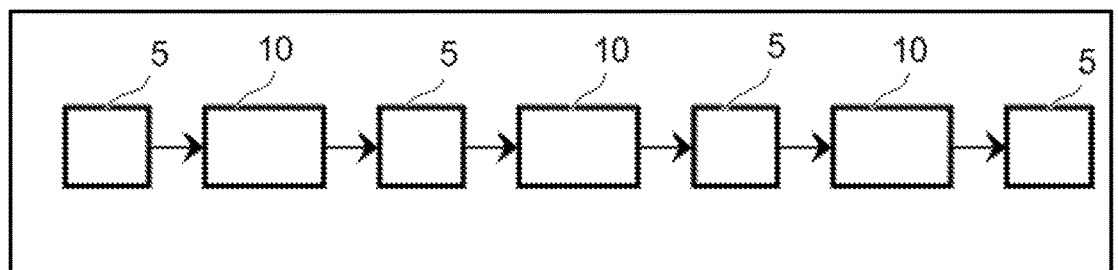
FIG. 5 is a diagram illustrating a signal flow between components of a system for solving an optimization problem, as in embodiments.

Rather than an architecture of the system 1, 1a, FIG. 5 is a diagram showing a logical flow of information where several iterations are performed with one or more cores 10, and information is relayed via one or more external processing unit 5. In a simple implementation, the system 1 includes a single core 10 and a single processing unit 5. A set of initial vectors are produced by the processing unit 5, and then injected in the crossbar 14 of the core 10 to perform one cycle of matrix-vector operations. Output values are collected by the processing unit 5, based on which a new iteration is started, and so on. Three iterations are assumed to be performed in the example of FIG. 5. Eventually, values outputted by the (last) core 10 are passed to the processing unit 5 for it to identify an optimal solution.

Alternatively, several iterations may be performed thanks to a system 1a including a plurality of core processing devices 10, each including a single crossbar 14. I.e., three distinct cores 10 may be involved in the example of FIG. 5, which can be cascaded, so that one core 10 performs a computation step after a previous core 10. To that aim, the cores 10 are coupled two-by-two via an external processing unit 5, which may be a same processing unit, or not. I.e., distinct processing units 5 may possibly be used (up to four in the example of FIG. 5). In all cases, a processing unit is used to compute values of the L input vectors, as well as the final solution.

Figure 6:
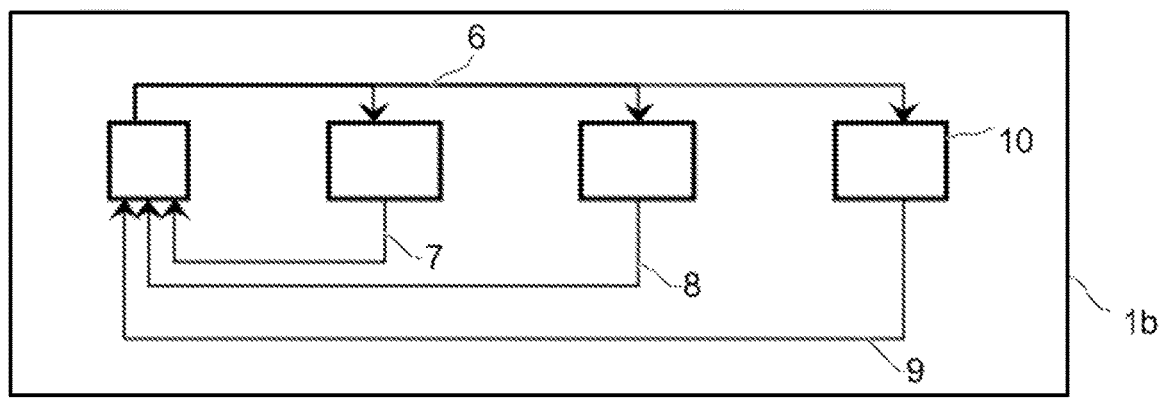
FIG. 6 is a diagram representing both a signal flow and the architecture of another system for solving an optimization problem, where the system includes a plurality of photonic crossbar array structures, as in embodiments.

A more efficient system 1b is shown in FIG. 6, where the cores 10 are arranged to perform parallel computations, e.g., thanks to a common signal bus 6. In this example, the figure reflects both the logical flow of information and the architecture of the system 1b. In this example, K crossbars (K≥2) are operated S30-S90 in a similar manner as described earlier, by applying K sets of electromagnetic signals to input lines of the K crossbars 14, respectively. Thus, K sets of matrix-vector operations can be concomitantly performed. In particular, the photonic memory devices of the crossbars may be programmed S20 in accordance with K distinct objective functions, so as to concomitantly solve multiple linear optimization problems. That is, the parameters of the objective functions are mapped to the core processing devices 10 by adequately programming the photonic memory devices 145 of the cores 10.

As further assumed in FIG. 6, the various sets of electromagnetic signals can multiplex input signals encoded at distinct wavelengths; such electromagnetic signals can thus be applied to the input lines 141 of the K crossbars via a common signal bus 6. Owing to the distinct wavelengths use to encode the input vectors, the electromagnetic signals do not interact in the common bus 6, thus enabling parallel computations across the various cores 10 (three in this example). The output values are collected via distinct lines 7, 8, 9 and passed to the processing unit 5. Again, several iterations may be performed to converge toward the optimal solution. Such iterations preferably employ a feedback mechanism making use of outputs obtained in parallel by the three cores 10, to optimally converge to the solution.

Next, according to another aspect, the invention can be also embodied as a processing system 1, 1*a*, 1*b* for solving an optimization problem. Basic features of this system 1, 1*a*, 1*b* have already been described above, in reference to FIGS. 1A, 1B, 2, 5, and 6. Such a system may involve one or more crossbars 14, as well as one or more processing units 5. As noted earlier, the latter may include, e.g., a digital processor 5, a computational memory unit with memristive devices, and/or a quasi-passive photonic processing unit.

Assume, for now, that the system 1 contains a unique core processing device 10, i.e., a single crossbar 14, as well as a unique processing unit 5, for simplicity. As described earlier, the crossbar 14 includes N input lines 141 and M output lines 149 interconnected at junctions via N×M photonic memory devices 145, where N≥2 and M≥2. The devices 145 are programmable, so as to store respective weights (corresponding to respective states of the devices 145), in accordance with the optimization problem to be solved. The processing unit 5 is notably configured to determine values of the L input vectors (L≥2), each having N components.

As seen in FIG. 2, the system further includes a signal generator 11, which is interfaced with the processing unit 5 to generate N electromagnetic signals based on values determined by the processing unit 5. This is done in such a manner that each of the N electromagnetic signals multiplexes L input signals encoded at respective wavelengths (e.g., using WDM), so as for the N electromagnetic signals to map the L input vectors of N components each. The system 1 further include a signal coupling unit 12, which is connected to each of the signal generator 11 and the crossbar 14. The coupling unit 12 is used to apply the N electromagnetic signals generated by the signal generator 11 to the N input lines 141 of the crossbar 14. In operation, this causes the crossbar 14 to simultaneously perform L×M matrix-vector operations as multiply-accumulate operations on the L input vectors, as described earlier.

The system 1 further includes a readout unit 15, which is configured to read out output signals obtained in output of the M output lines 149. The system 1 further includes a demultiplexing unit 16, which is configured to demultiplex output signals as read out by the readout unit 15, in operation. This makes it possible to obtain L×M output values, at each cycle. Moreover, the processing unit 5 is interfaced with the readout unit 15. The processing unit 5 is further used to determine a solution of the optimization problem, based on the L×M output values obtained.

In preferred embodiments, the system 1, 1*a*, 1*b* is designed to repeatedly obtain L×M output values through several iterations, preferably using a feedback mechanism as described earlier. That is, at each iteration but a first iteration, the values of the L input vectors are determined based on the L×M output values obtained at the previous iteration, the goal being to most efficiently converge toward an optimal solution, given some termination condition and convergence criteria.

In variants to single core implementations, the processing system 1*a*, 1*b* may possibly include a plurality of core processing devices 10 (each including a respective crossbar 14), as discussed earlier in reference to FIGS. 5 and 6. In particular, the system 1*b* may advantageously rely on a common signal bus 6. I.e., the signal coupling units 12 of the cores 10 can be connected, on the one hand, to the signal generator 11 and, on the other hands, to respective crossbars 14, via the common signal bus 6, as assumed in FIG. 6. In that case, the system 1*b* can apply electromagnetic signals (multiplexing input signals encoded at distinct wavelengths) to the input lines of each of the crossbars 14 via the common bus 6. This allows multiple sets of operations to be concomitantly performed, it being reminded that each set of matrix-vector operations already involves parallel operations, as discussed earlier. In variants, the cores 10 may be cascaded, as discussed earlier in reference to FIG. 5. In all cases, one or more processing units 5 can be involved.

The processing core 10 is preferably fabricated as an integrated device, i.e., an on-chip device, which includes the input lines 141, the output lines 149, and the photonic memory devices 145. The chip may further integrate the coupling unit 12, as well as the readout devices 15 and the demultiplexing devices 16. A processing unit 5 may possibly be integrated on the same chip. Preferably though, the unit 5 is provided as a distinct chip, adequately connected to the core processing chip 10.

In preferred embodiments, the photonic memory devices 145 of the processing system 1, 1*a*, 1*b* include non-volatile, phase-change photonic memory devices 145. In variants, the photonic memory devices 145 may include optical modulators (without phase-change memory devices), as discussed earlier. In the example of FIG. 2, each cell includes an on-chip broadband coupler at each cross-point, and each coupler includes a photonic memory device 145. In each case, the system 1, 1*a*, 1*b* may typically include a programming unit 20 (e.g., digital or optical), which is connected to the crossbar and adapted to program the photonic memory devices 145 in accordance with the optimization problem at hand. Additional aspects of the present systems are discussed in section 2.

The above embodiments have been succinctly described in reference to the accompanying drawings and may accommodate a number of variants. Several combinations of the above features may be contemplated. Examples are given in the next section.

Specific Embodiments—Technical Implementation Details

Preferred Processing System

In preferred embodiments, the core processing device 10 is realized as an on-chip processing engine. Non-volatile phase-change photonic memory elements 145 are used to perform the matrix-vector multiplications. The input signals are applied as optical signals, each encoded at a unique wavelength using WDM. A multitude of input signals (queries) are applied to perform the multiple (yet simultaneous) matrix-vector operations. This facilitates the simultaneous computation (and validation) of a set of solutions in the output solution space, where such solutions are multiwavelength output trajectories. Output signals are coupled to a processing unit 5 (electronics or photonics) for further processing. A local search function is performed on these output trajectories to identify the most optimal solution.

A microcomb can be used to generate the vectors and multiplex the signals. The input and output lines can for instance be realized as $Si_3N_4$ waveguides. An on-chip laser can be used to pump an integrated SiN soliton microcomb to generate a broadband frequency comb. Individual comb teeth which form the input vectors are modulated at high speeds, multiplied with a matrix of non-volatile phase-change memory cells, and summed along each column on a photodetector. Standard demultiplexers are used.

Preferred Flow

A preferred flow is depicted in FIG. 7. First, a given problem is selected S10. The problem is mapped onto the photonic memory devices 145, by correspondingly programming S20 the devices. Vector components are computed at step S30, e.g., so as to initially sample the configuration space of the problem. Next, N electromagnetic signals are generated at step S40. Each of the N signals multiplex L input signals is encoded at a respective wavelength, so as for the N signals to map the L input vectors of N components each. The generated signals are coupled S50 into the crossbar 14 at step S50, essentially concomitant with step S40. Output signals are subsequently read out S60 and demultiplexed S70 to obtain output values. Such values are processed at step S80, e.g., by an external processing unit 5. The latter tests S90 whether a termination criterion has been met, according to given convergence criteria. If so (S90: Yes), the solution is displayed at step S100. Else (S90: No), another iteration is started, whereby the vector components can be refined based on the results previously obtained. I.e., a feedback mechanism is implemented to advance further toward an optimal solution, as illustrated in the next section.

Example of Application

The above approach is applied to a Max-Cut problem with 12 vertices and 12 edges. The Max-Cut problem is an NP-complete problem, the goal of which is to find a maximum cut in a graph. I.e., one must find a single trace that cuts the greatest number of edges in a cyclic graph with 12 Vertices and 12. Edges. Each vertex can be in a state of 1 or −1. During optimization, the nodes are flipped between 1 and −1 until a minima is found. The edges can be compared to synaptic weight elements and can be equal to 1 or 0 depending on whether an edge is present or absent, respectively.

A number n (e.g., n=10) of random solutions are initialized, where each potential solution vector has 12 elements (each being either 1 or −1), as assumed in FIG. 4. Each input vector element is encoded at a unique, respective wavelength, such that the multiple inputs can be simultaneously computed at each computation step. The first block of the optimizer shown in FIG. 4 performs the matrix-vector iterations, resulting in 12 potential solutions. A solution is reached after some stopping criterion is met. The second block carries out local search and finds the output vector that corresponds to the global solution, if any.

The energies of the minima corresponding to the 10 unique random solutions can be plotted as a function of the iteration number (not shown). Using multiple inputs allows the energy landscape to be scanned. The different inputs typically land in different minima. However, some of the inputs may reach the global minimum, thanks to successive refinements performed at each iteration. By performing a local search on the obtained energies, the vector corresponding to the global minimum can be identified. In FIG. 4, this vector is assumed to be the vector $S_n$, after optimization. I.e., after one or more iterations, the final vector $S_n$ differs from the initial random vector $S_n$.

The photonic crossbar 14 is used to perform the computationally expensive matrix-vector multiplications. The subsequent local search block can be performed as follows. The problem has an unknown ground state. So, some criteria are used to nudge all input queries to find the minimum energy configuration. One approach is to find a configuration with minimum energy $E_{min}$ after a fixed number of iterations. This is used as a dynamic reference to find still lower energy configurations with queries stuck at higher energy configurations. Importantly, the $E_{min}$ reference does not act as an attractor; it simply lets the stuck queries escape their unfavorable minima, so that they can further scan through the energy landscape and potentially find a further lower $E_{min}$. The process is repeated, resembling simulated annealing, except that the use of multiplexed components allows the system to not lose the information of any of its past found minimal configuration. The local search block then performs that task of finding the minimal energy corresponding to the outputs or if sufficiently large iterations are performed, it finds the most repeating neuronal configuration in the array, which must correspond to the optimal solution.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other crossbar configurations can be contemplated, and other materials can be used to fabricate the crossbars.

What is claimed is:

1. A processor-implemented method of solving an optimization problem, wherein the method comprises:

operating a photonic crossbar array structure including N input lines and M output lines interconnected at junctions via N×M photonic memory devices, where N≥2 and M≥2, the photonic memory devices programmed to store respective weights in accordance with the optimization problem, wherein the structure is operated by:

determining values of L input vectors of N components each, where L≥2;

based on the determined values, generating N electromagnetic signals, each multiplexing L input signals encoded at respective wavelengths, so as for the N electromagnetic signals to map the L input vectors of N components each;

applying the N electromagnetic signals generated to the N input lines of the photonic crossbar array structure to cause the photonic crossbar array structure to simultaneously perform L×M matrix-vector operations as multiply-accumulate operations on the L input vectors;

reading out output signals obtained in output of the M output lines;

demultiplexing the output signals read out to obtain L×M output values; and determining a solution of the optimization problem based on the L×M output values obtained.

2. The method according to claim 1, wherein the values of the L input vectors are determined to sample a configuration space of the optimization problem.

3. The method according to claim 1, further comprising:
prior to applying the N electromagnetic signals, programming the devices in accordance with the optimization problem for the photonic memory devices to store said respective weights.

4. The method according to claim 3, wherein
the optimization problem is a linear optimization problem,
said solution is determined according to an optimization algorithm for said linear optimization problem.

5. The method according to claim 4, wherein the linear optimization problem is one of:
a travelling salesperson problem,
an Internet routing problem, and
a Max-Cut problem.

6. The method according to claim 4, wherein
the solution is determined by identifying a global optimum based on one or more of the L×M output values obtained, in accordance with the optimization algorithm.

7. The method according to claim 6, wherein
the values of the L input vectors are determined so as for the L×M output values obtained to draw trajectories in an output solution space, and
said solution is determined by searching through said trajectories to identify the global optimum.

8. The method according to claim 1, wherein, at generating the N electromagnetic signals, each of the N electromagnetic signals multiplexes L input signals that are encoded using wavelength division multiplexing.

9. The method according to claim 1, wherein
the values of the L input vectors are determined by a processing unit, wherein the processing unit is connected to the photonic crossbar array structure; and
said solution is determined by the processing unit.

10. The method according to claim 1, wherein
the method comprises repeatedly operating a photonic crossbar array structure using one or more core processing devices, each including a structure according to said photonic crossbar array structure, whereby several iterations of operations are performed based on the one or more core processing devices.

11. The method according to claim 10, wherein
the several iterations are performed with a plurality of core processing devices, each including a structure according to said photonic crossbar array structure.

12. The method according to claim 10, wherein,
at each but a first one of the several iterations, the values of the L input vectors are determined based on the L×M output values obtained at a previous one of the several iterations.

13. The method according to claim 1, wherein
K photonic crossbar array structures are operated similarly as said photonic crossbar array structure, where K≥2, by applying K sets of electromagnetic signals to input lines of the K photonic crossbar array structures, and
the photonic memory devices of the photonic crossbar array structures are programmed in accordance with K distinct objective functions, so as to concomitantly solve multiple linear optimization problems.

14. The method according to claim 13, wherein
the K sets of electromagnetic signals multiplex input signals encoded at distinct wavelengths and are applied to the input lines of the K photonic crossbar array structures via a common bus.

15. A processing system for solving an optimization problem, wherein the processing system comprises:
a photonic crossbar array structure including N input lines and M output lines interconnected at junctions via N×M photonic memory devices, where N≥2 and M≥2, the devices being programmable to store respective weights in accordance with the optimization problem;
a processing unit configured to determine values of L input vectors of N components each, where L≥2;
a signal generator interfaced with the processing unit to generate N electromagnetic signals based on values determined by the processing unit, whereby, in operation, each of the N electromagnetic signals multiplexes L input signals encoded at respective wavelengths, so as for the N electromagnetic signals to map the L input vectors of N components each;
a signal coupler connected to each of the signal generator and the photonic crossbar array structure to apply the N electromagnetic signals generated by the signal generator to the N input lines of the photonic crossbar array structure and cause the photonic crossbar array structure to simultaneously perform L×M matrix-vector operations as multiply-accumulate operations on the L input vectors;
a readout configured to read out output signals obtained in output of the M output lines; and
a demultiplexing circuit configured to demultiplex output signals read out by the readout unit and obtain L×M output values, wherein the processing unit is interfaced with the readout unit and configured to determine a solution of the optimization problem based on the L×M output values obtained.

16. The processing system according to claim 15, wherein the processing unit comprises one of:
a digital processor;
a computational memory unit having memristive devices; and
a quasi-passive photonic processing unit.

17. The processing system according to claim 15, wherein the system comprises:
a common signal bus; and
a plurality of core processing devices including respective photonic crossbar array structures such as said photonic crossbar array structure and respective signal coupling units such as said signal coupler, the respective signal coupler connected to the respective photonic crossbar array structures and the signal generator via the common signal bus, wherein
the system is configured to apply electromagnetic signals multiplexing input signals encoded at distinct wavelengths to the input lines of each of the photonic crossbar array structures via the common bus.

18. The processing system according to claim 15, wherein the system is configured to repeatedly obtain L×M output values through several iterations with a feedback mechanism, whereby, at each but a first one of the several iterations, the values of the L input vectors are determined based on the L×M output values obtained at a previous one of the several iterations.

19. The processing system according to claim 15, wherein the system further comprises a programming unit connected to the photonic crossbar array structure and adapted to program the photonic memory devices in accordance with the optimization problem, for the devices to store said respective weights.

20. The processing system according to claim 15, wherein the photonic memory devices are non-volatile phase-change photonic memory devices.

* * * * *